Oct. 14, 1930.  R. E. KINKEAD  1,778,392
COATING FOR WELDING ELECTRODES
Filed Dec. 13, 1928

Inventor,
Robert E. Kinkead

Witness:

Patented Oct. 14, 1930

1,778,392

UNITED STATES PATENT OFFICE

ROBERT E. KINKEAD, OF CLEVELAND, OHIO, ASSIGNOR TO HOLLUP CORPORATION, A CORPORATION OF ILLINOIS

COATING FOR WELDING ELECTRODES

Application filed December 13, 1928. Serial No. 325,851.

My invention relates to improvements in coatings for welding electrodes.

One object of the invention is to provide a coating, as an article of manufacture, separate and distinct from the electrode itself, but adapted to be applied readily to a bare electrode to convert the latter into a coated electrode if desired.

Another object is to provide an electrode coating of such characteristics as to result in a protective gaseous envelope near or surrounding the arc during the welding operation, thus protecting the weld until the metal solidifies.

A further object is to provide a separate flexible coating in the form of some readily available manufactured product to be applied, by the operator, to a so-called "bare electrode" of metal; a hollow tube of the confection known as licorice being well adapted to the purpose.

In the accompanying drawings I have illustrated several embodiments of the invention.

Figure 1:
Fig. 1 is an elevation of a metal electrode covered with the tube or coating.

In Fig. 1, the electrode 10 may be of any suitable material, such, for example, as a rod or wire of mild steel or of some alloy. This electrode has a coating 11 in the form of a tube having a bore slightly in excess of the diameter of the electrode so that it may be readily slipped thereon and held by friction, which latter may be increased if the fit is too loose by bending the electrode slightly. The tube is preferably made of flexible material so that in case the electrode is not straight, it may be slipped over the electrode without cracking or breaking.

Figure 2:
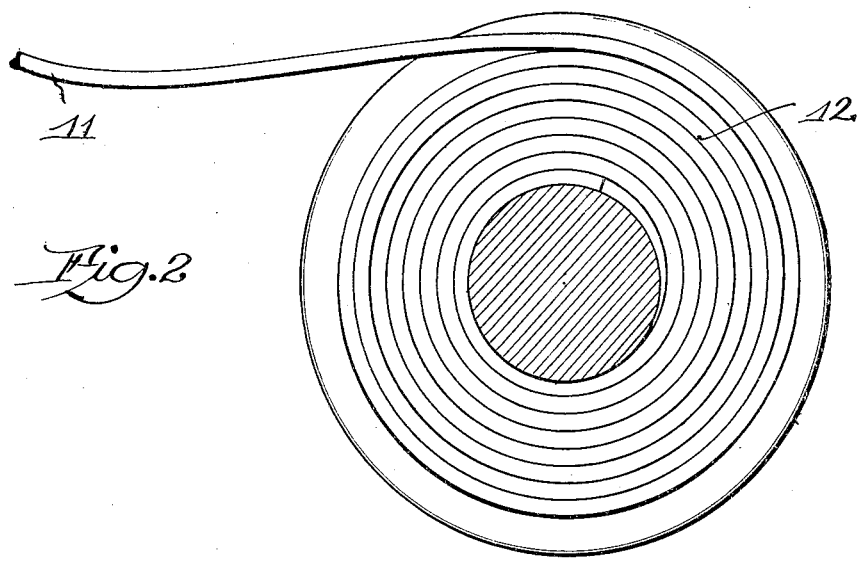
Fig. 2 is a side elevation of a coiled tube or licorice.
Figure 3:
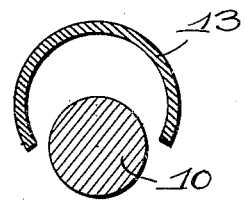
Fig. 3 is an enlarged section of an electrode with a split tubing separate from it to show another way of applying the coating.

One form of flexible tube suitable for this purpose is the confection known as licorice which is made in the form of a hollow tube and is sufficiently flexible so that it may be wound in the form of a coil 12, as shown in Fig. 2, for example. Where using this confection for a coating for electrodes, the flavoring of licorice may, of course, be omitted, the mass of material being made of the usual composition involving, in some cases, aniseed oil, flour, corn syrup, or other form of sugar, carbon and also other carbo-hydrates. For some purposes a tube of macaroni may be used, although it is more brittle.

It is advantageous also to coat the tubing, or mix in the material, ground glass which fuses during the welding operation, as in arc welding for example, and thus forms a protective coating over the molten metal.

Figure 4:
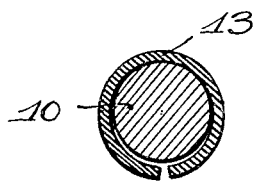
Fig. 4 is a section of the electrode with its coating thereon.

In some cases it may be desirable, instead of sliding the tube over the metal electrode, to split the tube 13 longitudinally and open it sufficiently to receive the rod or wire 10, after which the coating particularly springs together and may be bent to completely encircle the electrode, as in Fig. 4, for example. Such an arrangement would be desirable where the rod instead of being a bare rod carries some coating which it is desirable not to rub off by sliding a tube over it.

In commercial practice manufacturing companies which make considerable use of welding electrodes usually require both coated and uncoated electrodes in stock, and with the present invention they are enabled to coat such electrodes as require coating by merely cutting off a suitable length of tubing and slipping it over the welding wire or welding rod. With this arrangement it is possible to readily provide an electrode with whatever coating is required for a particular type of welding and coatings of different character may thus be kept in stock and an arrangement provided which is very flexible in that the stock of welding wire may be reduced. There is also an economy in freight in that the purchase of the bare wire and of the tubing may be made for less than the purchase of coated wire where the wire is to be shipped from the mill to some distant point to be coated, and then to various customers, some of which may be located in the territory of the mill.

The particular coating described herein has the effect, when heated by the arc, of forming a gaseous envelope surrounding or adjacent to the arc, thereby protecting the metal from the atmosphere while it is molten.

What I claim is:

1. A coating for welding electrodes comprising a flexible tube, the bore of which is in excess of the diameter of the electrode to which it is to be applied.

2. As a new article of manufacture, a flexible tubing, the bore of which is in excess of the diameter of the electrode to which it is to be applied and of a composition which forms a protecting vapor about the arc.

3. A coating for welding electrodes comprising a flexible tube, formed from plastic material containing a carbo-hydrate base.

In testimony whereof, I have subscribed my name.

ROBERT E. KINKEAD.